US005808614A

United States Patent [19]
Nagahara et al.

[11] Patent Number: 5,808,614
[45] Date of Patent: Sep. 15, 1998

[54] DEVICE AND METHOD FOR DISPLAYING A GUIDE PICTURE IN VIRTUAL REALITY

[75] Inventors: Junichi Nagahara, Tokyo; Toshikazu Minoshima, Kanagawa, both of Japan

[73] Assignee: Sony Corporation, Tokyo, Japan

[21] Appl. No.: 662,041

[22] Filed: Jun. 12, 1996

[30] Foreign Application Priority Data

Jun. 16, 1995 [JP] Japan ................................. 7-150766

[51] Int. Cl.⁶ ....................................................... G06F 3/00
[52] U.S. Cl. ........................... 345/355; 345/350; 345/357
[58] Field of Search .................................. 345/326–358, 345/976

[56] References Cited

U.S. PATENT DOCUMENTS

| | | | |
|---|---|---|---|
| 5,283,864 | 2/1994 | Knowlton | 395/350 |
| 5,310,349 | 5/1994 | Daniels et al. | 395/355 X |
| 5,381,158 | 1/1995 | Takahara et al. | 395/355 |
| 5,392,387 | 2/1995 | Fitzpatrick et al. | 395/350 |
| 5,438,662 | 8/1995 | Randall | 395/350 |
| 5,463,725 | 10/1995 | Henckel et al. | 395/350 |
| 5,524,195 | 6/1996 | Clanton, III et al. | 395/355 X |
| 5,555,354 | 9/1996 | Strasnick et al. | 395/355 |
| 5,590,268 | 12/1996 | Doi et al. | 395/355 X |
| 5,632,022 | 5/1997 | Warren et al. | 395/350 |

Primary Examiner—John E. Breene
Attorney, Agent, or Firm—Limbach & Limbach L.L.P.

[57] ABSTRACT

An on-line terminal device for displaying a virtual reality space based on the information purveyed by an on-line server. The on-line terminal device facilitates recognition of the position(s) in the virtual reality space and acquisition of the information in the virtual reality space. A guide picture representing the position information in the virtual reality space is pre-displayed in an iconized state on a display. On entry of data commanding the opening of the iconized guide picture, the guide picture is opened for representing the position information in the virtual reality space on the display.

14 Claims, 11 Drawing Sheets

DEVICE AND METHOD FOR DISPLAYING A GUIDE PICTURE IN VIRTUAL REALITY

BACKGROUND OF THE INVENTION

1. Field of the Invention

This invention relates to an on-line terminal device capable of displaying a virtual reality space by accessing an on-line server, and a picture display method in such on-line terminal apparatus.

2. Description of the Related Art

Recently, on-line services, in which an on-line server, as a server computer, is connected via a public network with an on-line terminal, as a client computer, and a variety of services are received on the on-line terminal device, has been developed. In such on-line services, it has been desired to improve a man-machine interface in order that a high degree of services will be received by the user.

Specifically, such a service has been developed in which, on the occasion of home shopping, as one of the on-line services, the user can purchase goods by shopping in a store in the virtual reality space displayed on a display device of the on-line terminal device.

However, if the user is to receive a variety of services in the virtual reality space as described above, it is difficult for the user to confirm his or her position in the virtual reality space or to get the information concerning the virtual reality space, such as the information on the site of the store or opening of a new store. That is, if the user desires to confirm his or her position in the virtual reality space or to get the information concerning the virtual reality space, he or she has to move to a site in the virtual reality space where there is a placard or a map. That is, the user can confirm his or her position in the virtual reality space or get the information concerning the virtual reality space only when he or she has come to such site.

It is possible in the virtual reality space for the user to jump at once from a given site to an other side by "jump" thereby enhancing the ease with which the user may use the virtual reality space. However, there lacks up to now a suitable method for representing the information concerning such jump on the display device. Thus it has been desired to improve the man-machine interface with regard to the jump function.

SUMMARY OF THE INVENTION

It is therefore an object of the present invention to provide an on-line terminal device in which the user can confirm his or her position or get the information in the virtual reality space easily and which is superior in the man-machine interface with regard to the jump function.

According to the present invention, there is provided an on-line terminal device including connection means for connection to an on-line server, entry means for entering a command by a user, control means for performing processing based on the information purveyed form the on-line server via the connection means and the command entered to the entry means, and display means for displaying a picture based on the processing performed by the control means. The on-line terminal device is designed to display a virtual reality space on the display means based on the information supplied via the connection means from the on-line server. The control means causes a guide picture representing at least the position information in the virtual reality space in an iconized state on the display means. The guide picture is opened on entry from the entry means of data commanding the opening of the iconized guide picture for displaying the position information in the virtual reality space on the display means.

As the position information represented by the guide picture, the information on the current position in the virtual reality space or the information on the position(s) other than the current position in the virtual reality space is displayed on the display means. If the information on the position(s) other then the current position in the virtual reality space is being displayed on display means as the position information represented by the guide picture, and data commanding a movement to the other position is entered from entry means, the control means causes a picture of the other position in the virtual reality space to be displayed on the display means.

In the on-line terminal device of the present invention, the guide picture representing the position information in the virtual reality space is pre-displayed in an iconized state. Thus the user may open the guide picture at any desired time to acquire the position information in the virtual reality space.

With the on-line terminal device according to the present invention, since the user may open the guide picture at any desired time to acquire the position information in the virtual reality space, the on-line terminal device is superior in operability. Since the user can jump to the position specified by the guide picture, the jump function can be exploited easily.

With the picture display method according to the present invention, since the user may open the guide picture at any desired time to acquire the position information in the virtual reality space, the on-line terminal device may be improved in operability. In addition, since the user can jump to the position specified by the guide picture, the jump function-can be exploited easily.

DESCRIPTION OF THE PREFERRED EMBODIMENTS

Figure 1:
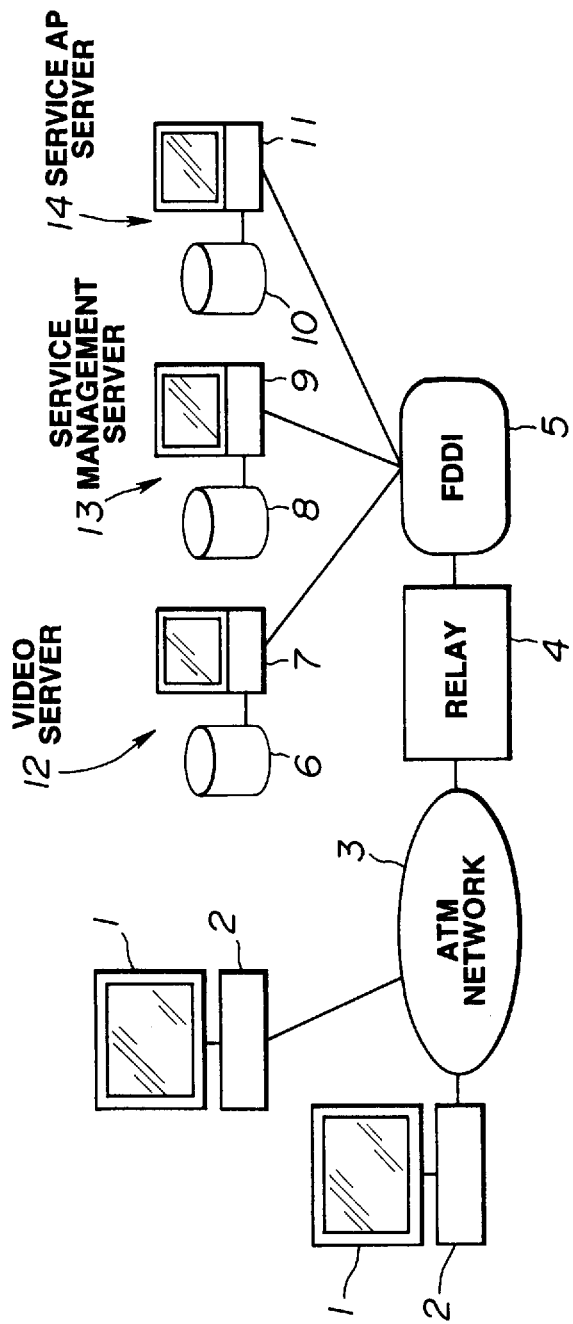
FIG. 1 is a block diagram showing an overall structure of a system including an on-line terminal device according to the present invention.
Figure 2:
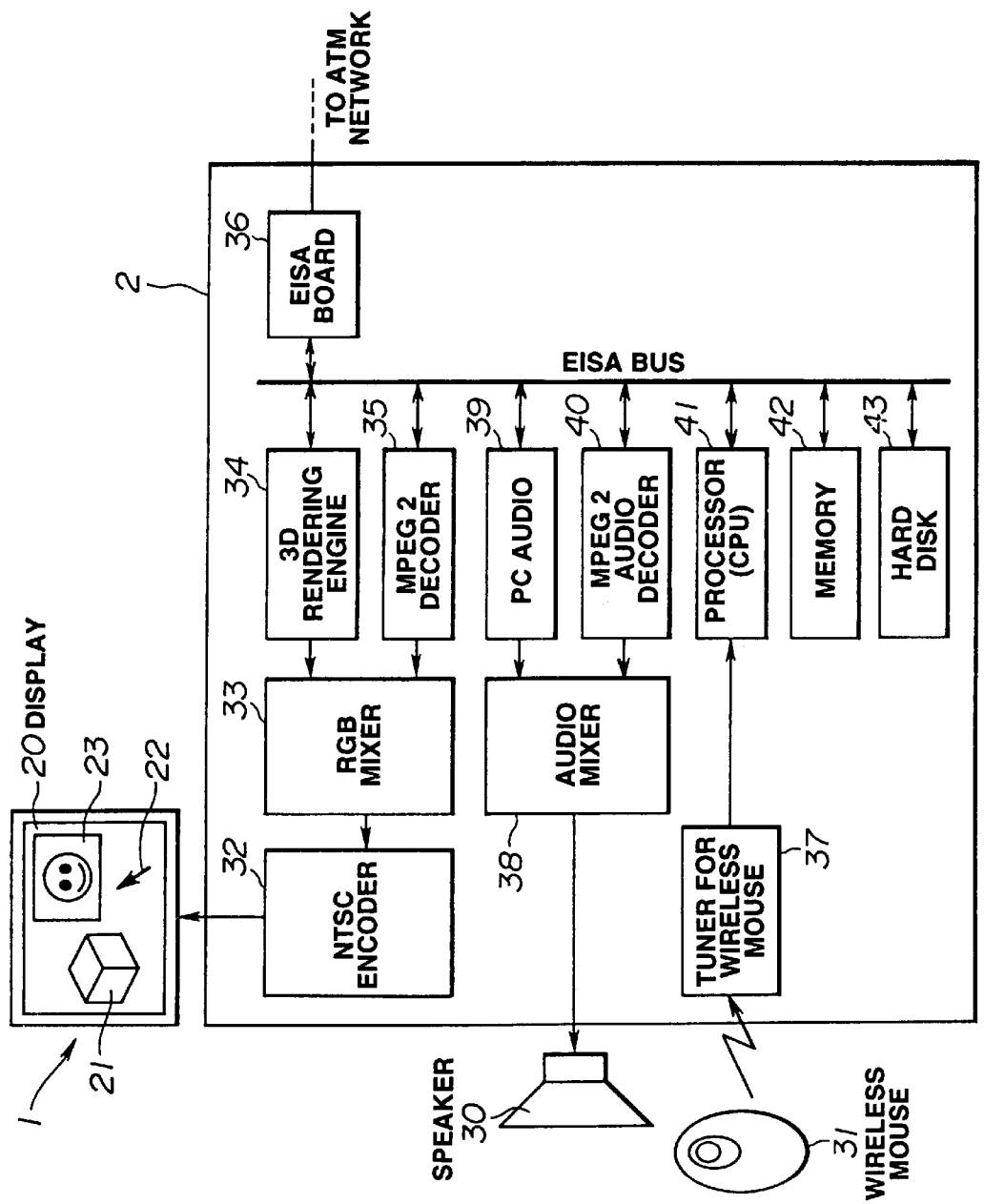
FIG. 2 is a block diagram showing an illustrative structure of an on-line terminal device according to the present invention.

Referring to FIGS. 1 and 2, an illustrative system in which the above-described information processing apparatus is employed as an on-line terminal apparatus is explained. The system of the present embodiment is an on-line service system in which an on-line server as a server computer is connected with an on-line terminal device as a client computer over a communication network and a variety of services are purveyed from the on-line server to the on-line terminal device. The on-line services may be enumerated by home shopping, video-on-demand, communication karaoke and game-soft distribution.

In the system of the present embodiment, an on-line terminal device 2, as a client computer, is connected via a large-scale ATM (asynchronous transmission mode) network 3, a relay 4, and a fiber distribution data interface (FDDI) 5, to a service management server 13, a video server 12 and a service AP server 14, which are service purveying side on-line servers, as shown in FIG. 1. The asynchronous transmission mode (ATM) divides the transmission data into plural fixed-length data, that is 48-byte-based data, irrespective of data types, and appends a 5-byte header, inclusive of the information concerning the address of the destination of data transmission, to the fixed-length data, in order to transmit data in terms of data units called "cells" each made up of 53 bytes. These cells, fed into the ATM network 3, are switched by the ATM switcher based on the header information. On arrival at the receiving terminal, the cells are restored to the original data based on the header information. The ATM network can transmit speech, moving pictures and computer data in admixture. The FDDI is a medium accessing system of a 100 Mbit/second token passing system employing optical fibers.

The video server 12 is comprised of a data storage device 6, made up of the server computer 7 and a data storage device 6, such as a hard disc or an optical disc. In the data storage device 6 is stored digital video data processed into, for example, the MPEG format as later explained. The digital video data is read out from the data storage device 6 of the video server 12 for transfer in response to a request from the on-line terminal device 2.

The service AP server 14 is similarly comprised of a server computer 11 and a data storage unit 10. In the data storage unit 10, data or scripts which form the basis of a three-dimensional picture as application (AP) program data is stored. From the data storage device 10 of the service AP server 14, the application program data is read out for transfer in response to the request from the on-line terminal device 2.

The service management server 13 is similarly comprised of a server computer 9 and a data storage device 8. The service management server 13 accepts requests from the on-line terminal device 2 and controls or manages the video server 7 or the service AP server 11 in response to these requests.

It is possible to provide plural video servers 12 and plural service AP servers 14, or to assemble the servers 12 to 14 in a single server.

The requests transferred through the ATM network 3 are transmitted to the server via a device for doing protocol conversion, termed a relay 4, automatic data distribution and data transfer speed conversion, and via the FDDI interface 5.

The data sent from the server in response to the requests from the on-line terminal device 2 is processed for display by the on-line terminal device 2 so as to be displayed on the display on the monitor. This completes a graphical user interface (GUI), that is a user interface employing the graphic display. Thus the user is able to operate or receive services as he or she views the graphic display on the display of the monitor device 1.

The on-line terminal device 2 shown in FIG. 1 is arranged as shown for example in FIG. 2. That is, the on-line terminal device 2 includes an EISA (Extended Industry Standard Architecture) board 36, as connection means for connection to an on-line server, a wireless mouse 31, as data entry means for entering coordinate data or instructions from the user, and a processing unit 41, as control means, for doing processing based on the information supplied from the on-line server via the connection means and instructions entered from the data entry means. The on-line terminal device 2 also includes a three-dimensional rendering engine 34, an MPEG decoder 35, a PC audio decoder 39, an MPEG2 audio decoder 40, an RGB mixer 33, an audio mixer 38, a tuner for a wireless mouse 37 and an NTSC encoder 22. The on-line terminal device 2 further includes a display 20, as display means for representing a picture based on processing by the control means, a memory 42, as storage means for transiently holding data, and a hard disc 43, as external storage means for storing and holding data or software. The virtual reality space is displayed on the display 20 based on the information supplied from the on-line server via the EISA board 36.

Referring to FIG. 2, the EISA board 36 is a board for communication interconnecting the on-line terminal device 2 and the ATM network 3. The signals supplied from the on-line server to the EISA board 36 via the ATM network 3 are transiently stored in the hard disc 43 controlled as to data reading and data recording by the processing unit 41. The signals are then read out depending on data sorts and supplied to the three-dimensional rendering engine 34, MPEG decoder 35, PC audio decoder 39 and to the MPEG2 decoder 40.

The 3D rendering engine 34 is a coordinate converter for converting three-dimensional coordinate data of a three-dimensional object into data for display on the display 20 of the monitoring device 1, that is into video data in the three-dimensional virtual reality space. That is, the 3D rendering engine 34 is designed to construct the graphical user interface (GUI) conforming to the application.

The MPEG2 decoder 35 is a decoder for expanding data compressed by the MPEG2 standard. Meanwhile, MPEG (Moving Picture Experts Group) 2 is an international standard for the technique of compression and expansion of moving pictures.

Since data from the 3D rendering engine 34 and data from the MPEG2 decoder 35 are both data of three prime colors of red (R), green (G) and blue (B), the RGB mixer 33 generates data which is a mixture of these three colors R, G and B.

The NTSC encoder 32 converts data from the RGB mixer 33 into signals of the television standards of NTSC (National Television System Committee) system. The video signals from the NTSC encoder 32 are displayed on the display 20 of the monitoring device 1. On the display 20 in the present embodiment, shown in FIG. 2, there are displayed the pointer (cursor) 22 by the pointing device 31, a picture 23 obtained on decoding MPEG2 and a picture for GUI by the 3D rendering engine 34, such as the three-dimensional or two-dimensional picture 21. The picture by the MPEG2 and the picture for GUI may be synthesized for display.

The PC audio decoder 39 generates, for example, the effect sound, using an ADPCM (adaptive differential pulse code modulation) sound source. The MPEG2 audio decoder 40 expands audio data compressed by MPEG2. The data from the PC audio decoder 39 and the data from the MPEG2 audio decoder 40 are mixed by the audio mixer 38 into audio signals which are sent to a speaker 30. The output speech from the speaker 30 is preferably the stereo speech or multi-channel speech. Use may be made of a recently developed system in which a sound image may be three-dimensionally fixed by controlling the phase difference of the stereophonic speech.

The operation on the display 20 employing GUI is executed using the wireless mouse 31, as a pointing device. The point information transmitted from the wireless air mouse is received by a wireless tuner 37. The received point information is sent to the processing unit 41. The pointing device may also be a usual mouse, trackball, joystick or a touch panel associated in the coordinate positions thereof with the display 20, in place of the wireless mouse 31. Of course, keyboards or the like may also be provided as data entry means in addition to the pointing device.

The processing unit 41 has a central processing unit (CPU), and controls various component elements over a bus based on program data stored in the program ROM of the memory 42 having the function of both the program ROM and the work RAM. The processing unit also controls the GUI based on coordinate data from the wireless mouse and occasionally executes the communication with the server computer. Although the 3D rendering engine 34 and the MPEG2 decoder 35 are provided as independent chips in the embodiment of FIG. 2, signal processing by these components may also be performed by software by the above processing unit 41.

The illustrative operation of on-line service purveying to the user in case of using the system of FIGS. 1 and 2 is now explained.

The user first instructs connection on the network of the on-line terminal device 2 to the server computer, herein the computer 9 of the service management server 13, using the pointing device 31 of the on-line terminal device 2.

When the connection on the network is completed on the network and the request is supplied from the on-line terminal device 2, the computer 9 of the service management server 13 on the server side is responsive to the request to control the video server 12 and the service AP server 14 to transfer data and software to the on-line terminal device 2. The data and software, thus transferred, are those required for processing, and may be enumerated by scripts stating the behavior of the virtual reality space, three-dimensional coordinate data and speech data in the virtual reality space and scripts stating alternatives instructed from the on-line terminal device 2 to the user.

The on-line terminal device 2 presents the virtual reality space, derived from the data and the software received from the server side, using the screen of the display 20 of the monitor device 1 and occasionally the speaker 30.

The user strolls in the inside of the virtual reality space presented on the on-line terminal device 2, as he or she views the virtual reality space and instructs the direction of movement and so forth. The user also operates on a component or installation in the virtual reality space by actuating an operating button or the like provided on the pointing device.

The on-line terminal device 2 is responsive to the user actuation by the viewing point position, viewing line direction, speech and the operation or behavior of the components in the virtual reality space in accordance with the scripts, and presents the virtual reality space to the user, with the aid of the display 20 of the monitoring device 1 and the speaker 30, as though the user were present in the virtual reality space. The on-line terminal device 2 is also responsive to the statement of the scripts to present a variety of information items or give an advice to the user or place an order for goods for the user.

Figure 3:
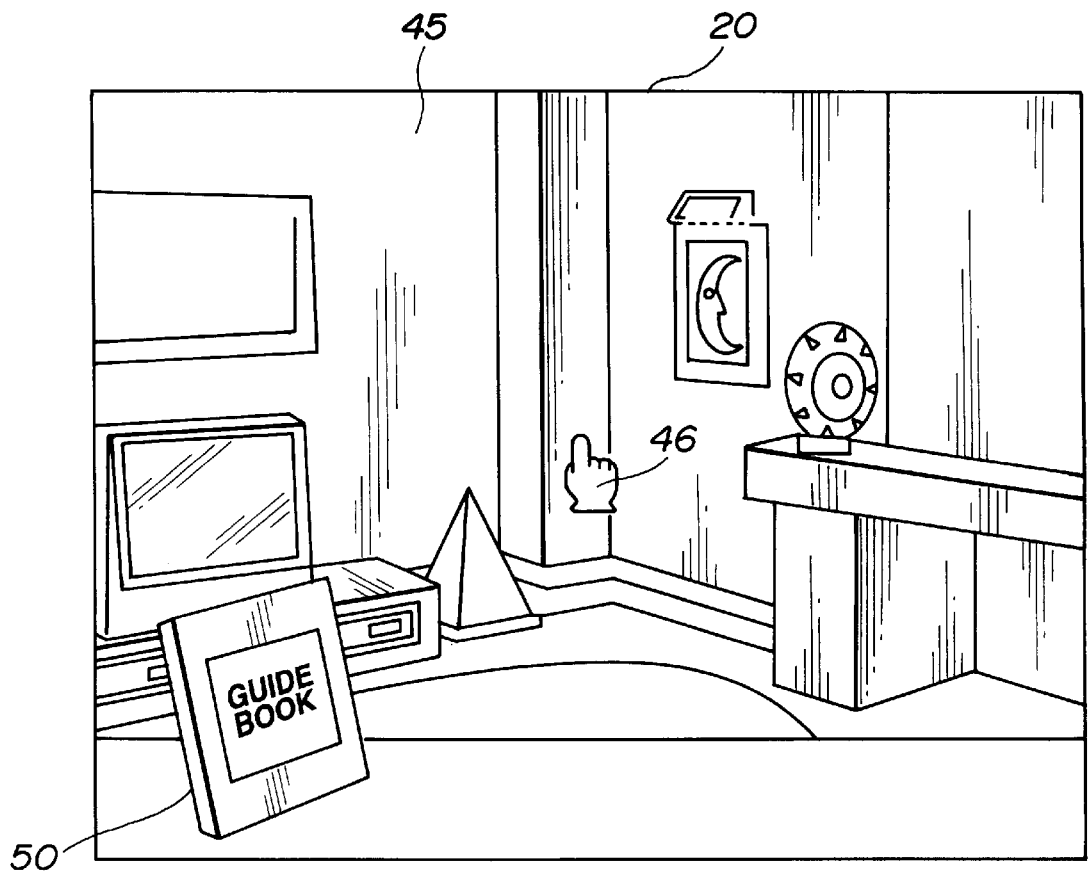
FIG. 3 illustrates an example of an iconized guide picture being displayed.

If, in the above system, the on-line terminal device 2 is accessing the on-line server, the control means of the in-line terminal device 2 is responsive to the information supplied from the on-line server, to display a picture 45 of a virtual reality space 45, in which the houses or stores are represented like a real world, a cursor 46 as a pointer for entering data from a pointing device and a guide picture 50 for purveying the information concerning the virtual reality space on a display 20, based on the information supplied from the on-line server, as shown in FIG. 3.

Figure 4:
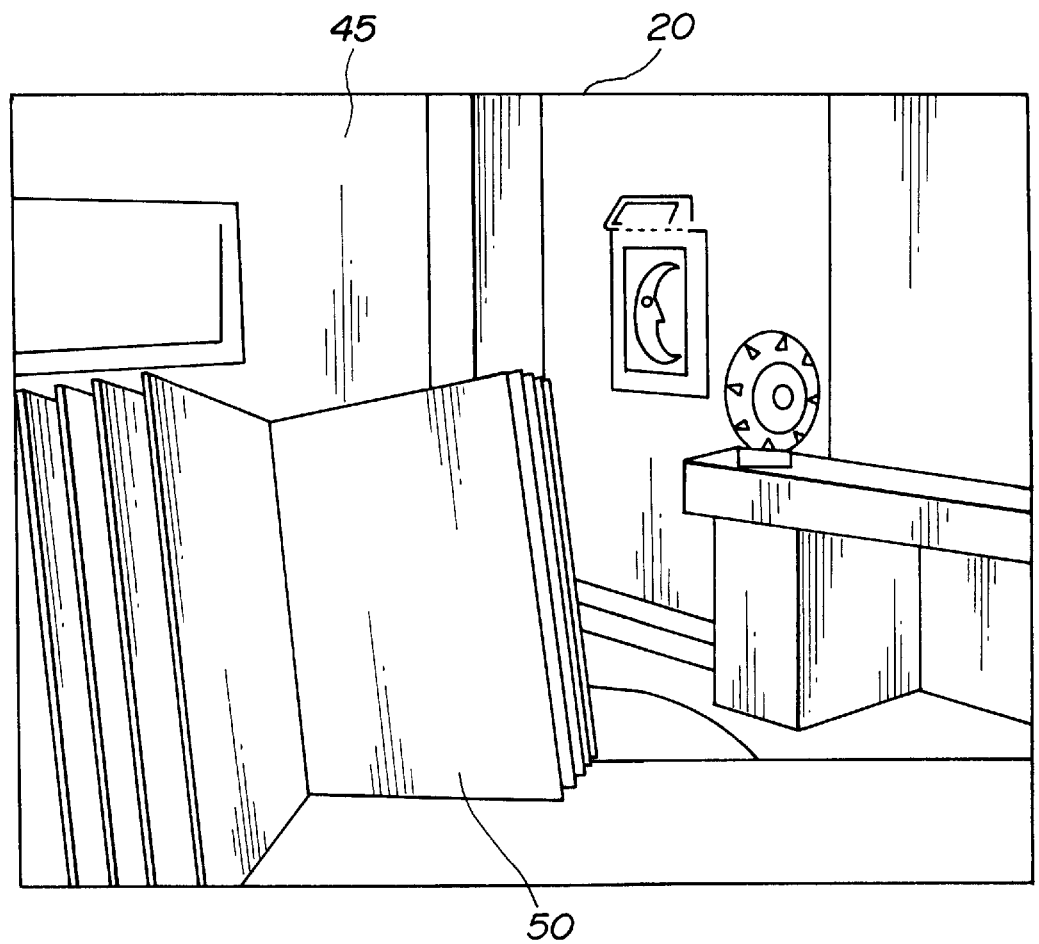
FIG. 4 illustrates an example of the iconized guide picture being opened.

The guide picture 50 is used for purveying the information for guiding the user in the virtual reality space, and is perpetually displayed on the display 20 without regard to user movement in the virtual reality space. This guide picture 50 is formulated so as to look like a system notebook or memorandum and is displayed, in an initial state, as an iconized guide picture against a picture 45 in the virtual reality space at a corner of the display 20. Once the user enters a command by entry means, such as a wireless mouse, for opening the guide picture 50, the guide picture 50 is displayed on the display 20 as a system memorandum being folded open as shown in FIG. 4. On the other hand, if the guide picture 50 is displayed as a system memorandum folded open on the display 20, and the user enters a command for closing the guide picture 50 by entry means, such as a wireless mouse, the guide picture is again displayed at a corner of the display 20 in the iconized state, as shown in FIG. 3.

Figure 5:
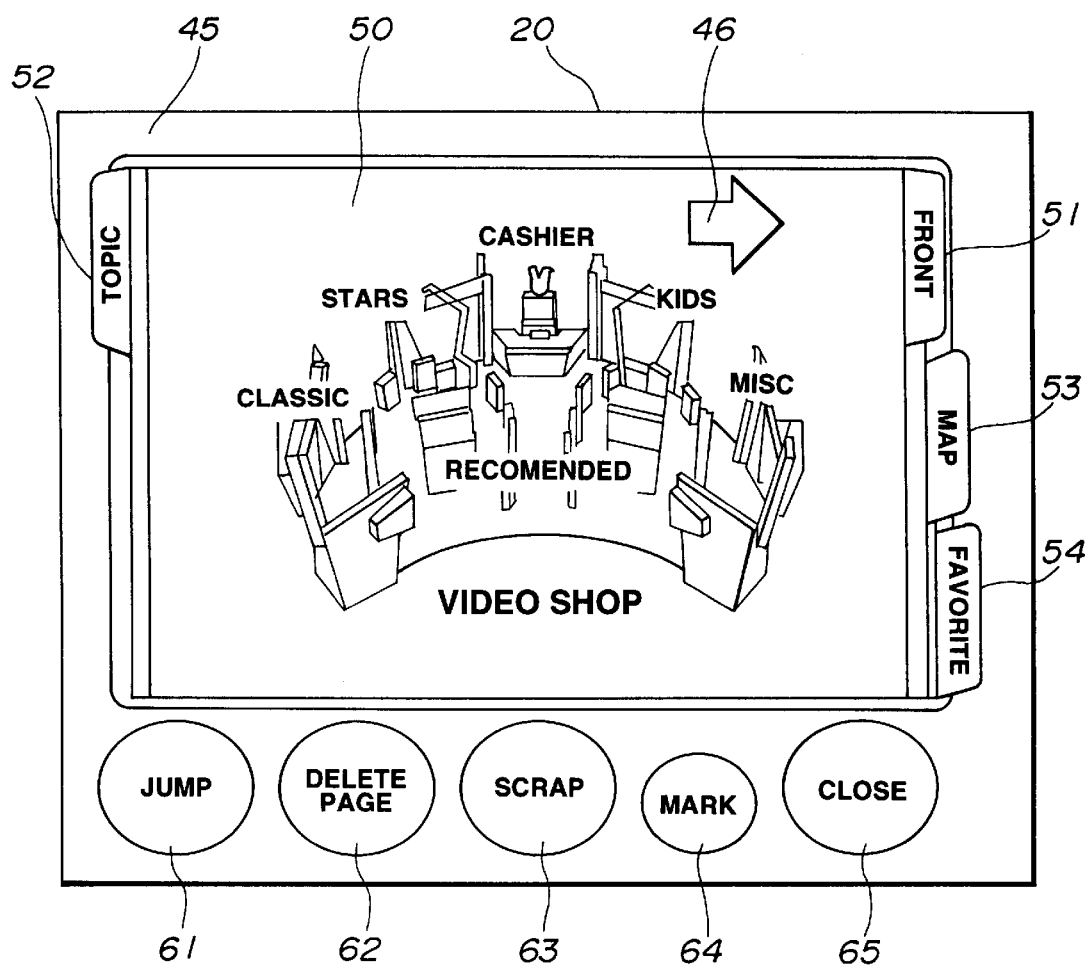
FIG. 5 illustrates an example of an opened guide picture being displayed.

The guide picture 50, looking like a system notebook or memorandum, includes a front portion 51, in which to file the information concerning the current location of the user in the virtual reality space purveyed by the on-line server, a topic portion 52, in which to file the various information purveyed by the on-line server, a map portion 53 in which to file the map information purveyed by the on-line server and a favorite portion 54 in which to file the position information edited by the user, as shown in FIG. 5. Each of these portions are provided with a tab which may be specified by the user for opening the corresponding page.

The front portion 51, topic portion 52 and the map portion 53 are server purveying portions in which the information is purveyed by the on-line server. The favorite portion 54 is a user editing portion that may be edited by the user. The topic portion 52, the contents of which are updated by the on-line service purveyor, is a portion in which various information sorts purveyed by the on-line service purveyor, such as opening of a new store, is filed. Thus the user may easily acquire various information sorts in the virtual reality space by having reference to the information in the topic portion 52. The map portion 53, the contents of which are similarly updated by the on-line service purveyor, is a portion in which the map in the virtual reality space is filed. The user may easily acquire various information sorts in the virtual reality space by having reference to the information in the topic portion 52. The favorite portion 54 is a portion which can be easily edited by the user. The user can copy portions of the front portion 51, topic portion 52 and the map portion 53 for filing in this favorite portion 54. Thus the user may file pages frequently used or desired to be stored in this favorite portion 54.

When the guide picture 50 is displayed in the folded-open state, a jump button 61, a page deletion button 62, a scrap button 63, a mark button 64 and a closure button 65 are also displayed on the display 20, as shown in FIG. 5. By designating these buttons using the pointing device, pre-set commands defined by the buttons are entered in control means. That is, by designating the jump button 61 or the page deletion button 62, a jump command and a page deletion command are entered, respectively. By designating the scrap button 63, scrap commands are entered. By designating the mark button 64, commands for mark deletion and for mark setting are entered, respectively. By designating the closing button 65, a command for iconizing the guide picture 50 is entered. The processing corresponding to these commands is explained in detail in the following description on operation.

An illustrative operation of the on-line terminal device 2 in the above-described system is now explained in connection mainly with display of the guide picture.

Figure 6:
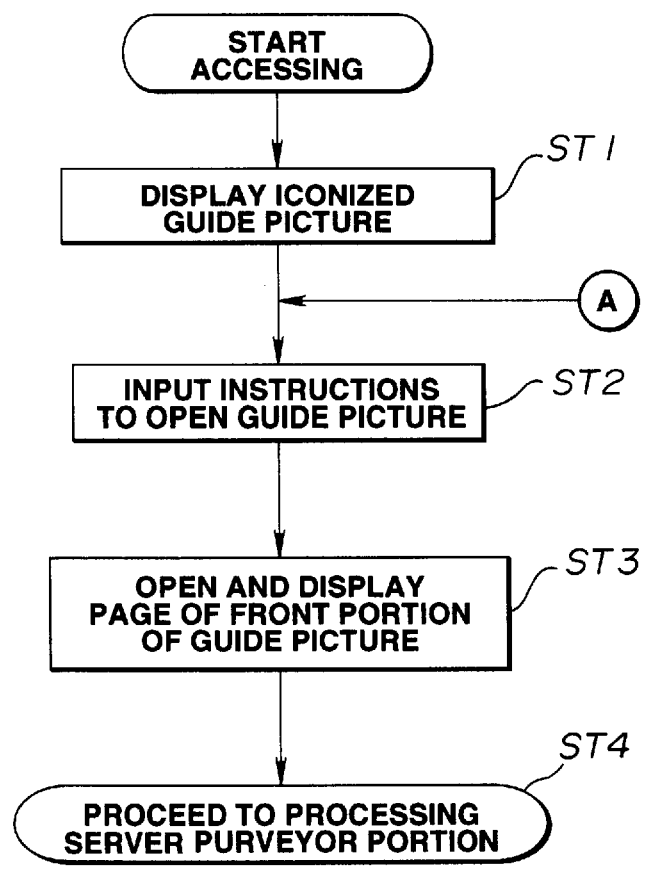
FIG. 6 is a flow chart showing display of the guide picture by an on-line terminal device according to the present invention.

Referring to the flowchart of FIG. 6, if access is had from the on-line terminal device 2 to the on-line server, control means displays at step ST1 an initial picture of the virtual reality space as the background and the iconized guide picture 50 on the display 20, based on the information purveyed from the on-line server, as shown in FIG. 3. As the initial picture of the background and as the iconized guide picture 50, a picture of a private room and a picture looking like a closed system notebook, for example, are displayed, respectively. If the guide picture 50 is in this iconized sate, the user can receive various services purveyed in the virtual reality space without regard to the guide picture 50.

If the iconized guide picture 50 is displayed, and a command for opening the guide picture 50 is entered in the control means, as shown at step ST2, the control means causes a picture of the opened system notebook shown in FIG. 5 to be displayed on the display 20 as the guide picture 50. The control means causes an opened page of the front portion 51, having filed therein the information concerning the current location of the user in the virtual reality space, to be opened as the guide picture 50. By opening the guide picture 50 in this manner, the user can immediately acquire the information concerning his or her current location in the virtual reality space.

The processing then transfers to step ST4 for carrying out processing of the server purveyor, that is the processing with the page of the server purveying portion, such as the front portion 51, being opened, in order to await command entry from the user.

Figure 7:
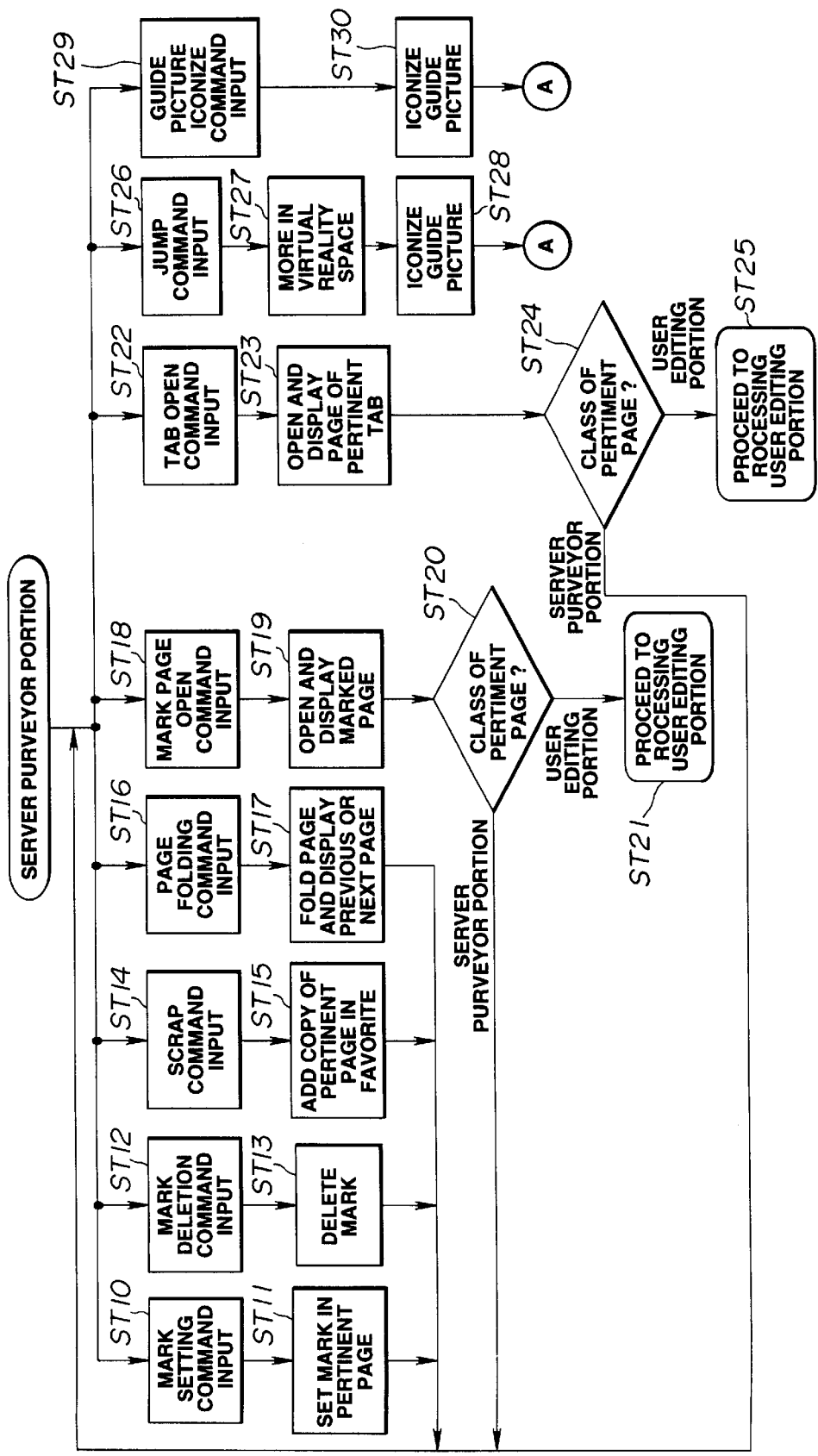
FIG. 7 is a flowchart showing the processing of a server purveyor portion.
Figure 8:
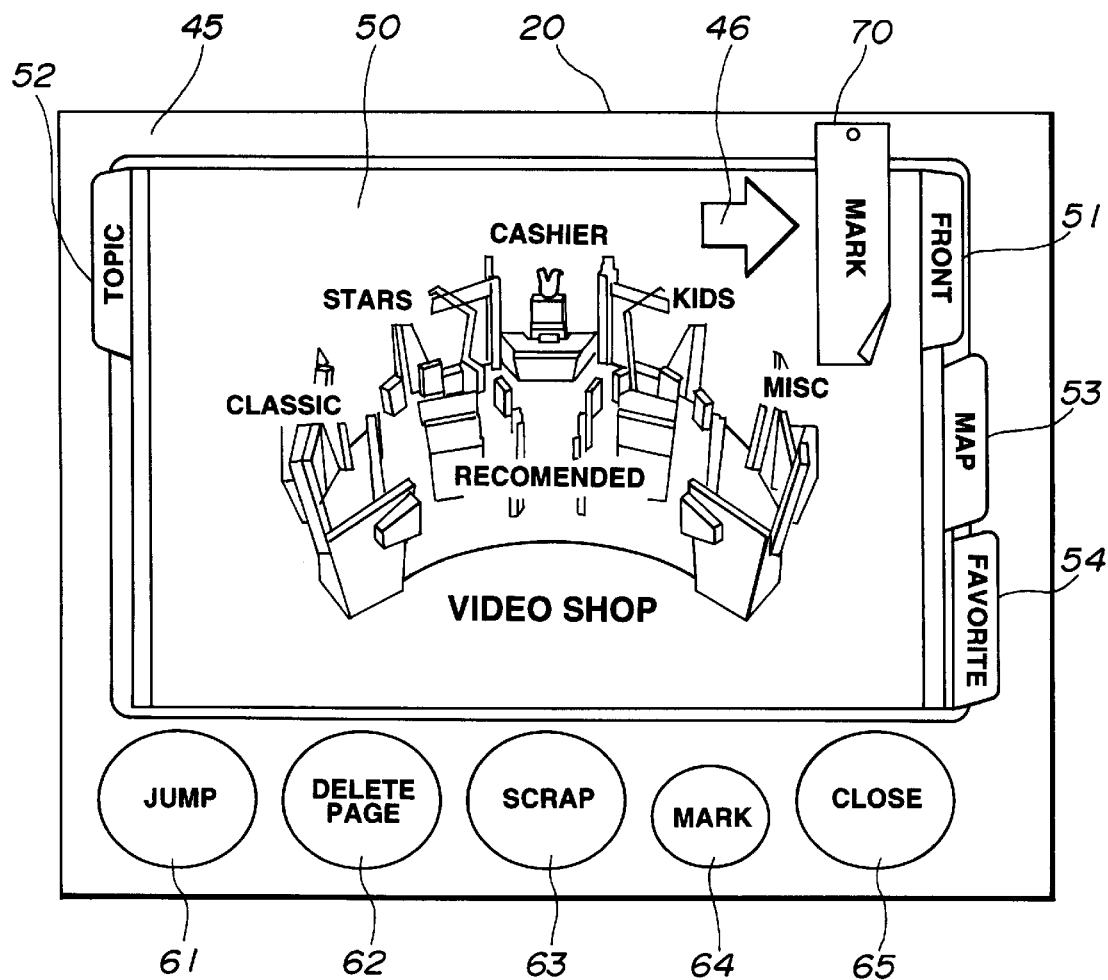
FIG. 8 illustrates an example of a mark set in the guide picture.

In the processing of the server purveyor portion, the processing shown in the flowchart of FIG. 7 is carried out. That is, if a command for setting a mark in the currently opened page is entered to the control means, by designating a mark button 64 by the pointing device for a non-marked page, the control means sets the mark in the page at step ST11, and displays the currently opened page of the guide picture 50 having a mark 70 bonded thereto, as shown in FIG. 8. The mark 70 is similar to a usual book marker for the system notebook. By setting the mark 70 in this manner, the page can be immediately opened, even if some other page is currently opened, by commanding the page marked by the marker 70 to be opened. Of course, such marks can be set for plural pages. After the end of the processing of step ST11, the processing reverts to the beginning of the processing of the server purveyor portion, to await a command entry by the user.

If the mark button 64 is designated by the pointing device for a pre-marked page for commanding the control means to delete the currently opened page, as indicated at step ST12, the control means deletes the mark of the page and the mark bonded to the currently opened page for displaying the guide picture 50. After the end of the processing of step ST13, the processing reverts to the beginning of the processing of the server purveyor portion, to await a command entry by the user.

If the scrap button 63 is designated by the pointing device for commanding the control means to scrap the currently opened page, as indicated at step ST14, the control means adds a copy of the page at step ST15 as the last page of the favorite portion 54. The control means displays an animation representing the operation of the copy of the page being filed in the favorite portion 54. This helps the user appreciate the fact that the page has been added to the favorite portion 54. By providing this scrap function, the page of the server purveyor portion, in which the page addition or deletion can be done by the on-line server, can be edited by the user, can be copied in the favorite portion 54. After end of the processing at step ST15, the processing reverts to the beginning portion of the server purveyor portion in order to await the entry of the user command.

If a page-folding command is entered by the pointing device, as indicated at step ST16, the control means displays at step ST17 a guide picture 50 in which the page has been folded or the previous or succeeding page has been opened. The control means displays at this time an animation representing the page-folding operation. This helps the user to appreciate the fact that the page has been folded. As to which of the previous page and the succeeding page should be folded, the previous page may be opened if the page folding command has been issued when the cursor is towards left side of the guide picture 50, while the next page may be opened if the page folding command has been issued when the cursor is towards right side of the guide picture 50. That is, if the right side position on the guide picture 50 is specified by the pointing device, the next page is opened, whereas, if the left side position on the guide picture 50 is specified by the pointing device, the previous page is opened. After end of the processing at step ST17, the processing reverts to the beginning portion of the server purveyor portion in order to await the entry of the user command.

If a command for opening a page with a mark set thereon is entered to the control means, as shown at step ST18, the control means opens the page with the mark set thereon for displaying the guide picture 50 at step ST19. The command for opening the page with the mark set thereon is entered by designating the corresponding mark by the pointing device. The class of the page is then judged at step ST20. If the page is the page of the user editing portion, such as the favorite portion 54, the processing proceeds to the user editing portion as shown at step ST21 to await the entry of the user command. If the page is the page of the server purveyor portion, such as the front portion 51, topic portion 52 or the map portion 53, the processing reverts to the beginning portion of the server purveyor portion in order to await the entry of the user command.

If a command for opening a tab is entered by the pointing device, as shown at step ST22, the control means opens the page of the tab for displaying the guide picture 50 at step ST23. That is, if the tab of the front portion 51 or the tab of the topic portion 52 is designated by the pointing device, the control means causes the first page of the front portion 51 or the first page of the topic portion 52 to be opened, respectively. On the other hand, if the tab of the map portion 53 or the tab of the favorite portion 54 is designated, the control means causes the first page of the map portion 53 or the first page of the favorite portion 54 to be opened, respectively, for displaying the guide picture 50. Then, at step ST24, the class of the page is judged. If the page is that of the user edit portion, such as the favorite portion 54, the processing transfers to processing of the user editing portion, as indicated by step ST25, in order to await the command input from the user. On the other hand, if the page is that of the server purveying portion, such as the front portion 51, the topic portion 52 or the map portion 53, the processing reverts to the beginning of the server purveyor portion in order to await the entry of the user command.

If the jump button 61 is designated by the pointing device for entering a jump command to the control means, that is a command to move at a time from the current location in the virtual reality space to a position specified by the currently opened page of the guide picture 50, the control means moves the user position in the virtual reality space to the jump destination point at step ST27 and causes the picture of the virtual reality space at the jump destination point to be displayed. In addition, the control means causes the iconized guide picture 50 to be displayed at a corner of the display 20 at step ST28. The control means then reverts to step ST2 in FIG. 6 so as to be at a standby state to await the entry of the user command. If the information other than the position information is displayed in the currently opened page of the guide picture 50, nothing is performed, with the user position in the virtual reality space remaining at the current position. If the user designates the closure button 65 by the pointing device for causing the control means to iconize the guide picture 70, as shown at step ST29, the control means iconizes the guide picture 50 at a corner of the display 20, as step ST30. The control means then reverts to step ST2 of FIG. 6 to await a command entry by the user.

Figure 9:
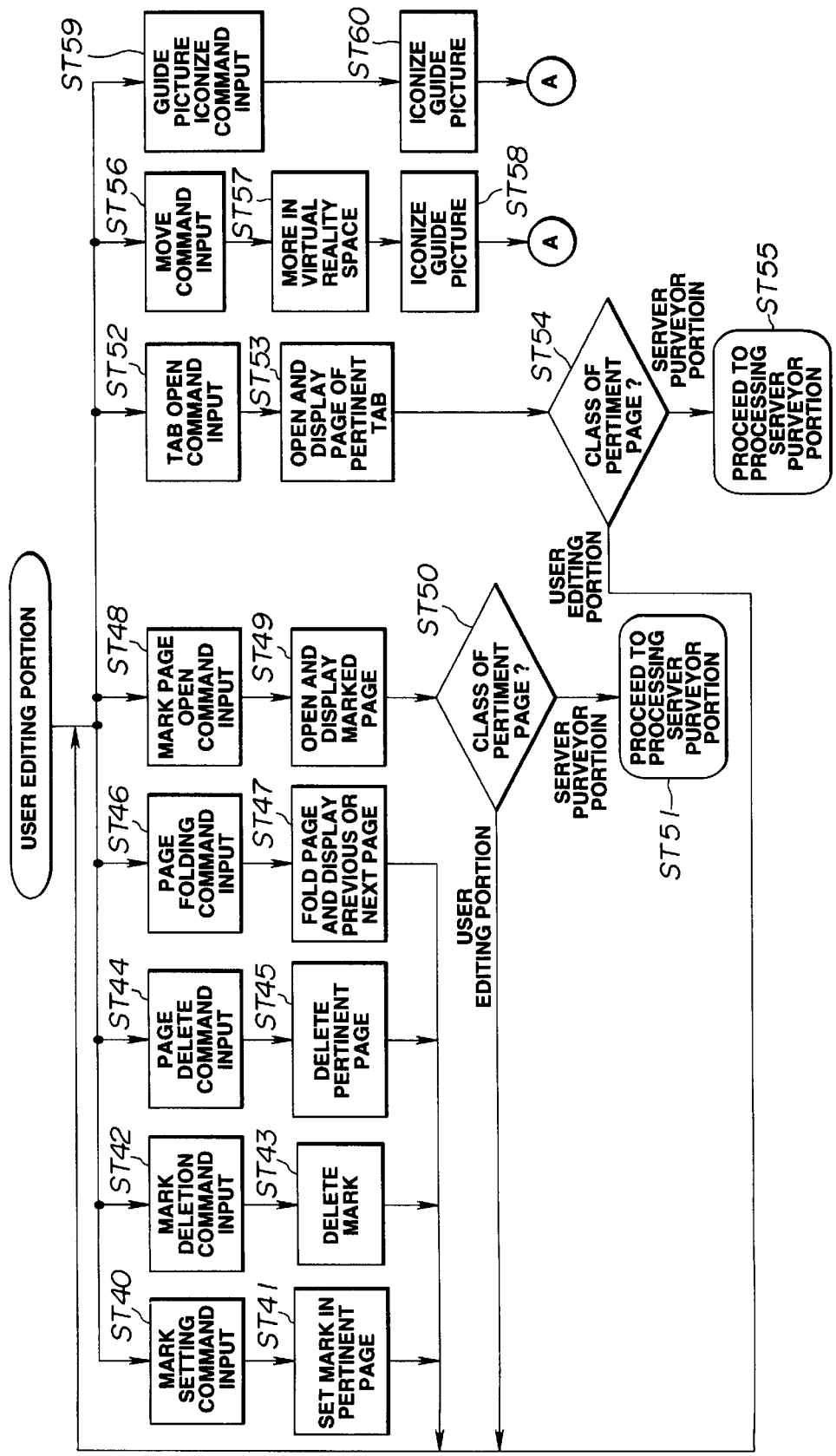
FIG. 9 is a flowchart showing the processing of a server purveyor portion.

The user editing processing performs processing shown by the flowchart of FIG. 9. That is, if the user designates the mark button 64 for a non-marked page by the pointing device, for entering a command of setting a mark in the currently opened page, as shown at step ST40, the control means sets the mark for the page for causing a picture with a mark thereon on the currently opened page of the guide picture 50, as shown at step ST41. After end of the processing at step ST41, the processing reverts to the beginning portion of the user editing processing in order to await an entry of a user command.

If the user designates the mark button by the pointing device for the pre-marked page, for entering a command of deleting the mark from the currently opened page, as shown at ST42, the control means causes the mark to be deleted from the page at step ST43 to delete the mark affixed to the currently opened page to display the guide picture 50. After end of the processing at step ST43, the processing reverts to the beginning portion of the user editing processing to await an entry of a user command.

If the user designates the page deletion button 62 by the pointing device to enter a command of deleting the currently opened page to the control means, as shown at step ST44, the control means causes the page to be deleted ,as shown at step ST45, to display the next page. By providing such page deletion function, it becomes possible for the user to edit the favorite portion 54 freely in conjunction with the above-described scrap function. After end of the processing at step ST45, the processing reverts to the beginning portion of the user editing processing to await an entry of a user command.

If the user enters a page-folding command to the control means by the pointing device, as shown at step ST46, the control means folds over the page to display the guide picture 50 in which the previous page or the next page has been opened, as shown at step ST47. The page-folding processing may be performed in the same way as the page-folding processing in the server purveyor processing explained in connection with the step ST17 described above. After end of the processing at step ST47, the processing reverts to the beginning portion of the user editing processing to await an entry of a user command.

If a command is entered by the pointing device to the control means for opening the page with the mark set thereon, as shown at step ST48, the control means causes the page with the mark thereon to be opened for displaying the guide picture 50 at step ST49. The command for opening the page with the mark set thereon is entered by operating on the pointing device for designating the pertinent mark. The class of the page is then judged at step ST50. If the page is the page of the user editing portion, such as the favorite portion 54, the processing reverts to the beginning portion of the user editing processing to await an entry of a user command. If the page is the page of the server purveying portion, such as the front portion 51, topic portion 52 or the map portion 53, the processing transfers to the processing of the server purveying portion to await an entry of a user command.

If a tab-opening command is entered to the control means by the pointing device, as shown at step ST52, the control means causes the page of the tab to be opened at step ST53 to display the guide picture 50. If the tab of the front portion 51, that of the topic portion 52, that of the map portion 53 or that of the favorite portion 54 is designated by, for example, the pointing device, the control means causes the first page of the front portion 51, the first page of the topic portion 52, the first page of the map portion 53 or the first page of the favorite portion 54 to be opened to display the guide picture 50, as at step ST23 of the server purveyor processing. The class of the page is then judged at step ST54. If the page is that of the user editing portion, such as the favorite portion 54, the processing reverts to the beginning portion of the user editing portion to await the entry of a user command. If the page is that of the server purveyor portion, such as the topic portion 52 or the map portion 53, the processing proceeds to server purveyor portion, as shown at step ST55, to await the entry of a user command.

If the jump button 61 is designated by the pointing device, as shown at step ST56, to enter a jump command, that is a command of moving at a time from the current position in the virtual reality space to a position represented by the currently opened page of the guide picture 50, to the control means, the control means causes the user to move to the jump destination to display the picture of jump destination of the virtual reality space at step ST57 and to iconize the guide picture 50 and display it at a corner of the display at step ST58. The processing then reverts to step ST2 of FIG. 6 to await the entry of a user command. Of course, if the information other than the position information is displayed in the currently opened page of the guide picture 50, no processing is executed, with the user portion in the virtual reality space remaining unchanged.

If the closure button 65 is designated by the pointing device for entering to the control means a command of iconizing the guide picture 50, as shown at step ST59, the control means causes the guide picture 50 to be iconized to display it at a corner of the display 20 at step ST60. The processing then reverts to step ST2 of FIG. 6 to await the entry of a user command.

In the above explanation, it is assumed that the guide picture 50 has the front portion 51, topic portion 52, map portion 53 and the favorite portion 54. However, the guide picture 50 is formulated to look like a system notebook and may have an increased number of classes, as the occasion may demand, similarly to the actual system notebook.

If a certain page filed in the favorite portion 54 of the guide picture 50 but not used for prolonged time, display may be made for prompting the user to delete the unused page. Specifically, the time and date of page addition to the favorite portion 54 may be recorded as the time and date on which the page was used for the last time, this time and date being updated whenever the page of the favorite portion 54 is used. At a pre-set time, the time and data of ultimate use is compared to the current time and date for each page of the favorite portion 54 and, if the difference exceeds a pre-set time duration, a message is displayed for enquiring the user whether the page can be deleted because of prolonged non-use. If the user enters a deletion command, the page is deleted. Conversely, if the user enters a command of not deleting the page, the page is reserved without being deleted. Examples of the pre-set time of comparing the time and date of ultimate use to the current time and date include the time of starting accessing the on-line server from the on-line terminal device 2, the time of entry of a command of opening the guide picture 50 by the user and the time of entry of a command for opening the favorite portion 54 of the guide picture 50 by the user.

By making a display prompting the user to delete the page which has once been filed in the favorite portion 54 but which has not been used for prolonged time, it becomes possible to prohibit unneeded pages from being increased in the favorite portion 54.

A so-called pager function of receiving a message from the on-line server may also be annexed in the guide picture 50.

Figure 10:
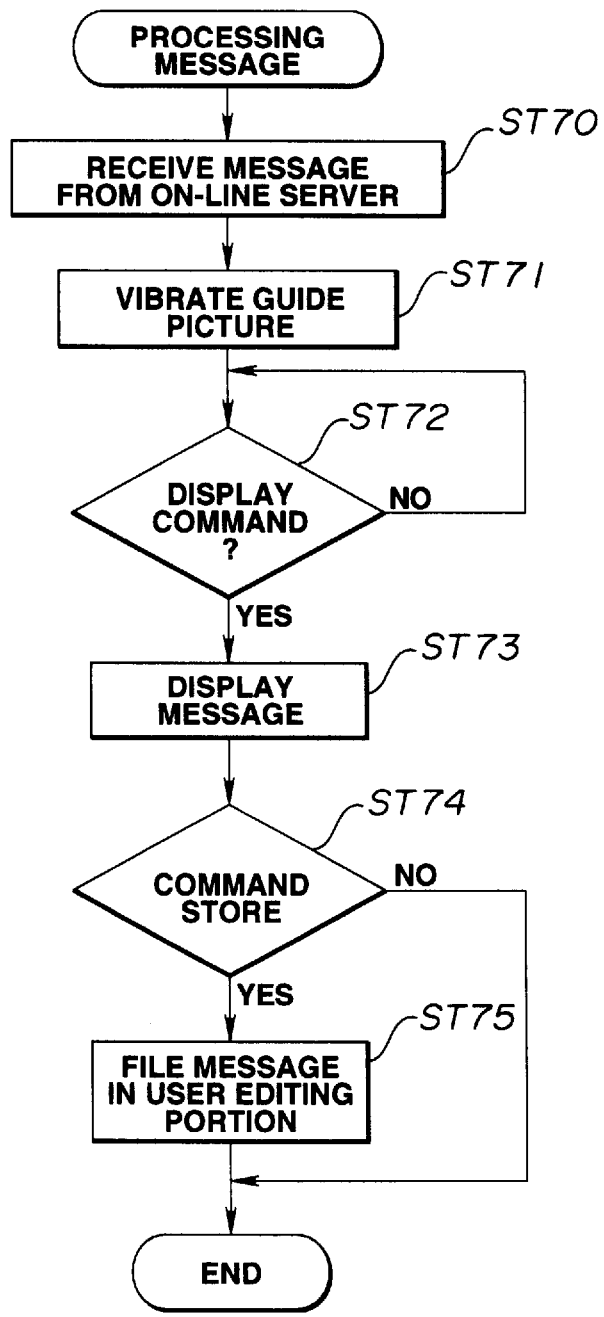
FIG. 10 is a flowchart showing processing of a message from the on-line server.

Referring to the flowchart of FIG. 10, if a message is supplied from the on-line server to the on-line terminal device 2, the control means captures a message at step ST70 from the on-line server. The message may, for example, be the time and date contents of the system maintenance and the information as to the arrival of goods at a store in the virtual reality space. At step ST71, the control means causes the guide picture 50 to be vibrated and displayed on the display 20. The user viewing the status of the guide picture 50 may be apprised that the message has arrived from the on-line server. Instead of vibrating the guide picture 50 for making a display on the display 20, a message advising the user of the arrival of the message may be displayed on the display 20 or the speech may be announced for advising the arrival of the message to the user.

Figure 11:
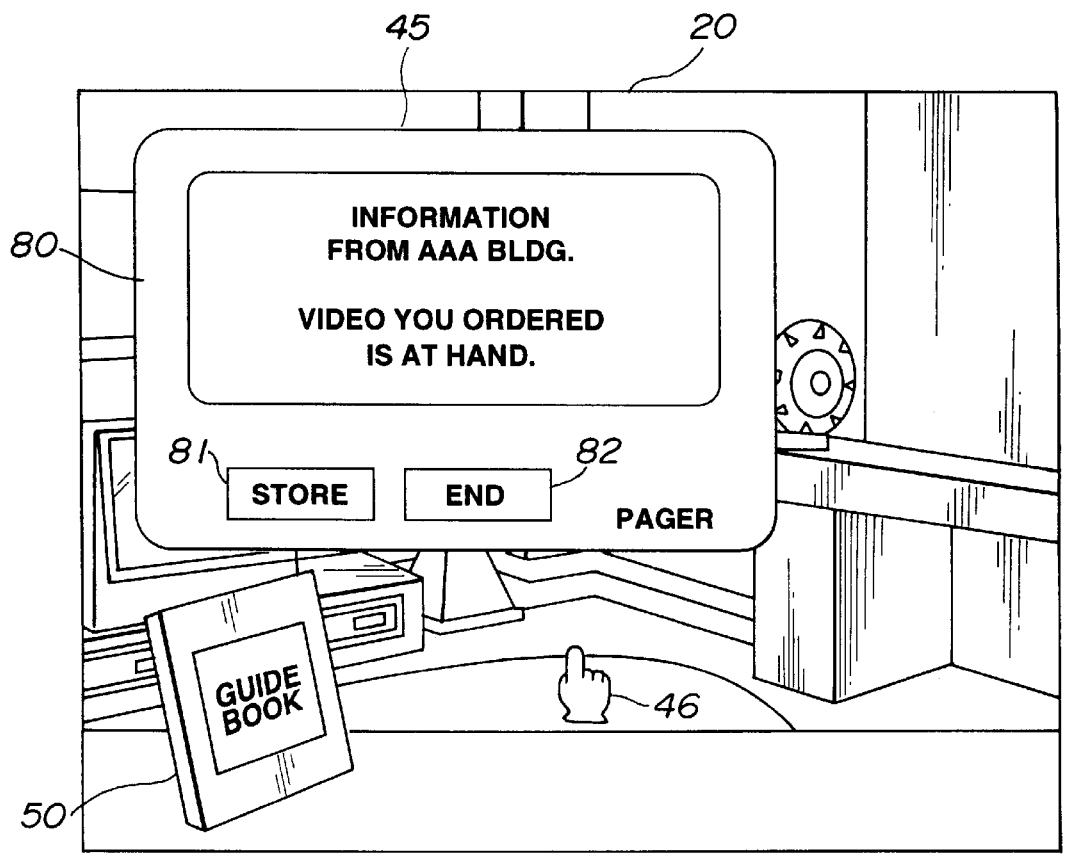
FIG. 11 illustrates an example of the manner of displaying the message from the on-line server.

At step ST72, the control means judges whether or not a command has been entered by the user for displaying the message. The command for message display may be set so as to be entered when the user moves the cursor 46 over the guide picture 50 using the pointing device and clicks the guide picture 50 twice in an extremely short time (double click). If the message display command is not entered by the user within a pre-set time, the control means awaits a message display command as it performs other processing operations. If the message display command is entered, the control means displays at step ST73 the message on the display 20, along with the message display picture 80, as shown in FIG. 11.

The control means then judges at step ST74 whether the user has pressed a storage button 81 or an end button 82 by the pointing device. If the storage button 81 has been pressed, the control means adds the page stating the message in the favorite portion 54 for storage before terminating the message display at step ST75. This enables the user to refer to the message from the on-line server at a later time. The place of storage of the message from the on-line server need not be the favorite portion 54. Thus it is possible to provide, as a user editing portion of the guide picture 50, a pager in which to file a message from the on-line server and to file the message from the on-line server in this pager portion. If the end button 82 is designated at step ST74, the message display is immediately terminated.

What is claimed is:

1. An on-line terminal device comprising:
   connection means for connection to an on-line server;
   entry means for entering a command by a user;
   control means for performing processing based on the information purveyed from the on-line server via said connection means and the command entered from said entry means; and
   display means for displaying a picture based on the processing performed by said control means;
   said on-line terminal device being designed to display a virtual reality space on the display means based on the information supplied via said connection means from the on-line server; wherein the improvement resides in that
   said control means causes a guide picture representing at least the position information in said virtual reality space to be displayed previously in an iconized state on said display means;
   said control means causing the guide picture to be opened on entry from said entry means of data commanding the opening of the iconized guide picture for displaying the position information in the virtual reality space on the display means.

2. The on-line terminal device as claimed in claim 1 wherein the information on the current position in the virtual reality space is displayed on said display means as the position information represented by said guide picture.

3. The on-line terminal device as claimed in claim 2 wherein the information on at least one position other than the current position in the virtual reality space is displayed on said display means as the position information represented by said guide picture;
   said control means on entry thereto from said entry means of data commanding movement to said other position causing a picture of the virtual reality space at the commanded other position to be displayed on said display means.

4. The on-line terminal device as claimed in claim 3 wherein said guide picture is a picture formulated so as to look like a system notebook having at least a server purveyor portion designed for filing the position information purveyed by the on-line server and a user editing portion designed for filing the position information that may be edited by the user, said position information being entered in each page of said system notebook;
   said control means on entry from said entry means of data commanding page folding of said system notebook causing the page of the system notebook to be folded to display the position information stated in the newly opened page on said display means.

5. The on-line terminal device as claimed in claim 4 wherein said control means on entry from said entry means of data commanding providing a mark on a specified page of the system notebook causing a mark to be provided in said specified page, said control means on entry from said entry means of data commanding displaying the page provided with the mark causing the page provided with the mark to be opened for displaying the position information stated on said page on said display means.

6. The on-line terminal device as claimed in claim 4 wherein said control means on entry from said entry means of data commanding adding the position information of a specified page in the server editing portion causing said specified page to be added to the user editing portion.

7. The on-line terminal device as claimed in claim 1 wherein said control means on being supplied with a message from said on-line server via said connection means causing the display of the guide picture: to be varied for indicating that the message has been supplied.

8. A method for displaying a picture representing a virtual reality space on display device of an on-line terminal connected to an on-line server, based on the information supplied from said on-line server, wherein the improvement comprises:

previously displaying a guide picture representing at least the position information in said virtual reality space in an iconized state on said display device; and opening said guide picture on entry of data commanding opening of the guide picture in the iconized state for displaying the position information in said virtual reality space on said display device.

9. The picture display method as claimed in claim 8 wherein the information on the current position in the virtual reality space is represented as the position information represented by said guide picture.

10. The picture display method as claimed in claim 9 wherein one or more positions other than the current position in the virtual reality space is also represented as the position information represented by said guide picture, and wherein, if data commanding movement to said other position is entered, a picture in the other position as commanded in the virtual reality space is displayed.

11. The picture display method as claimed in claim 10 wherein said guide picture is a picture formulated so as to look like a system notebook having at least a server purveyor portion designed for filing the position information purveyed by the on-line server and a user editing portion designed for filing the position information that may be edited by the user, said position information being contained in each page of said system notebook; and wherein the page of the system notebook is folded on entry of data commanding page folding of said system notebook for displaying the position information stated in the newly opened page.

12. The picture display method as claimed in claim 11 wherein, if data commanding providing a mark on a specified page of the system notebook is entered, a mark is provided in said specified page, and wherein, if data commanding displaying the page provided with the mark is entered, the page is opened for displaying the position information stated on said page.

13. The picture display method as claimed in claim 11 wherein, if data commanding adding the position information of a specified page in the server editing portion to the user editing portion is entered, said specified page is added to the user editing portion.

14. The picture display method as claimed in claim 8 wherein, if a message is supplied from said on-line server, the display of the guide picture is varied for indicating that the message has been supplied.

* * * * *